Sept. 6, 1960 J. L. BITNER ET AL 2,951,418
CORRECTIVE LENS HOLDER FOR FACE MASK
Filed Dec. 6, 1957 2 Sheets-Sheet 1
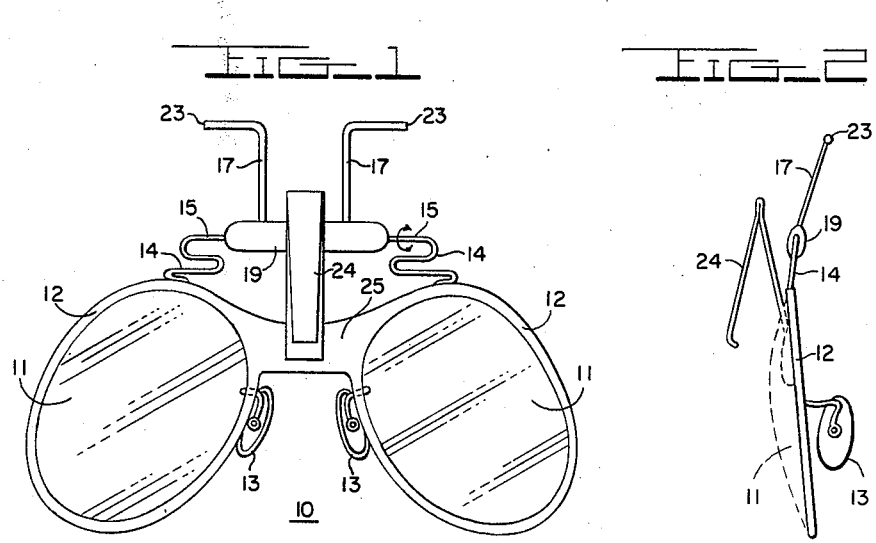
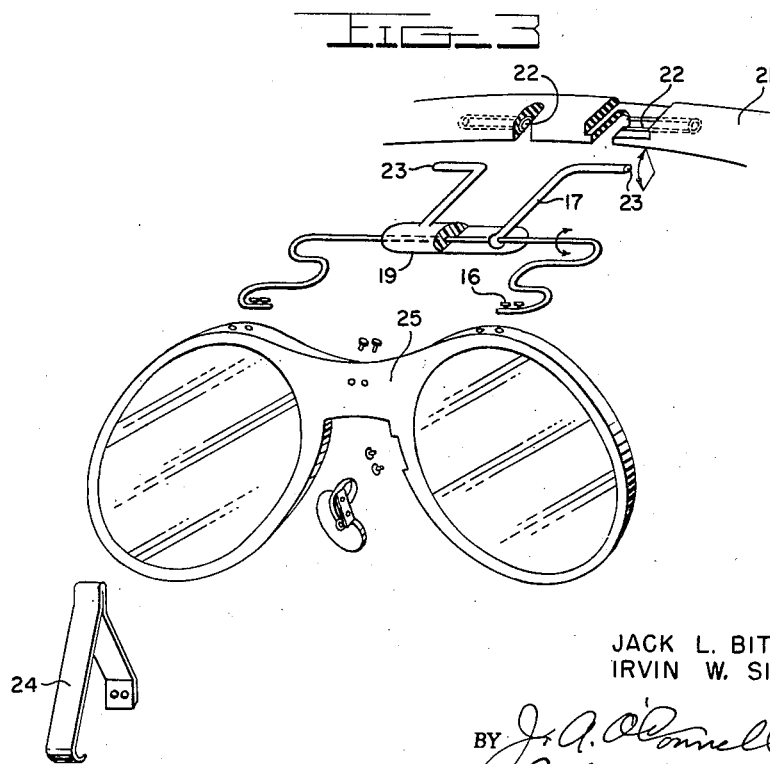
INVENTOR
JACK L. BITNER
IRVIN W. SILBERSTEIN Sept. 6, 1960 J. L. BITNER ET AL 2,951,418
CORRECTIVE LENS HOLDER FOR FACE MASK
Filed Dec. 6, 1957 2 Sheets-Sheet 2
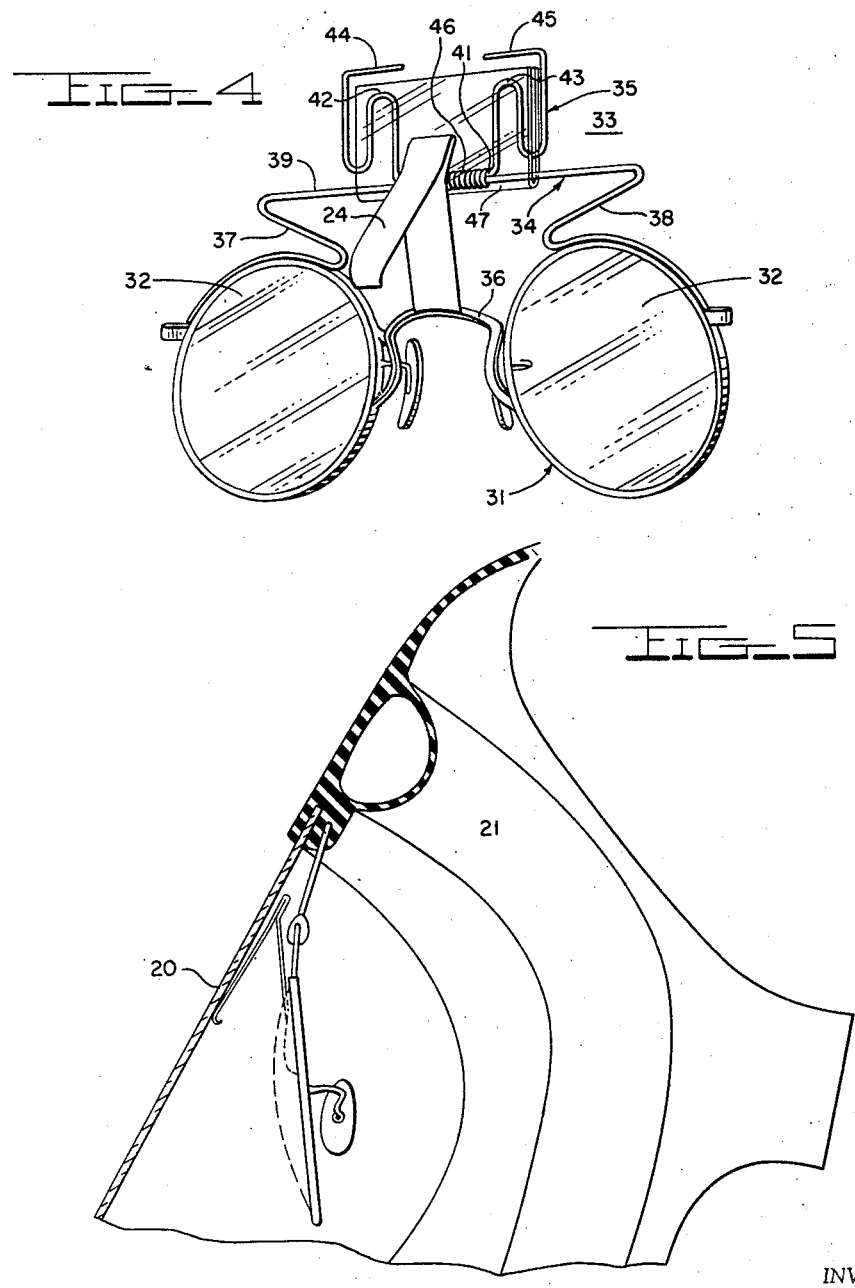
INVENTOR
JACK L. BITNER
IRVIN W. SILBERSTEIN United States Patent Office 2,951,418
Patented Sept. 6, 1960

2,951,418

CORRECTIVE LENS HOLDER FOR FACE MASK

Jack L. Bitner, Oxon Hill, Md., and Irvin W. Silberstein, Daly City, Calif., assignors to the United States of America as represented by the Secretary of the Navy Filed Dec. 6, 1957, Ser. No. 701,276

5 Claims. (Cl. 88—41)

(Granted under Title 35, U.S. Code (1952), sec. 266)

The invention described herein may be manufactured and used by or for the Government of the United States of America for governmental purposes without the payment of any royalties thereon or therefor.

The present invention relates to the use of corrective glasses in different types of face masks and more particularly to an improved corrective lens holder for a gas mask.

It is well known that certain people must wear corrective glasses in their everyday living. Certain equipment such as various kinds of masks, are worn by welders, miners, firemen, airmen, divers and especially gas masks are worn by military and civilian personnel to perform their duties at various times. The use of masks has presented a serious problem where the mask fits tightly against the face for a gas or liquid tight seat. Such a seal prevents the use of regularly worn corrective glasses with temple bars and requires specially made glasses for each person such that the glasses can be used with any mask. For the purposes of the present invention a gas mask will be used throughout for illustrative purposes.

Heretofore gas masks have been made with individual and separate corrective lenses connected to the face piece of the gas mask at the mask face window(s). Some connections are made by one point suspensions and others have been known to be made into a frame which is inserted into a flange at the windows of the mask. The lenses of the above types extend across the windows and are movable with the mask each time the mask is moved relative to the face. This makes it difficult to keep the lenses properly positioned with respect to the eyes and can be rather dangerous at times if the individual cannot see objects in the proper perspective. Other difficulties reside in adjusting the glasses for individual needs such that the glasses fit correctly.

It is an object of the present invention to provide a mask with corrective glasses without the danger of admitting undesirable gases.

Another object is to provide corrective glasses for a mask which are comfortable, easily adjustable and of approximately standard design.

Still another object is to provide corrective glasses for a mask which do not move with respect to the eyes as the mask face moves.

Yet another object is to provide corrective glasses which will assume the proper position with respect to the eyes as do ordinarily worn glasses.

Other and more specific objects of this invention will become apparent upon a careful consideration of the following detailed description when taken together with the accompanying drawings, in which:

Fig. 1 is a front view of the holder and lens arrangement of the present invention;

Fig. 2 is a side view of a lens and the frame connected therewith;

Fig. 3 is an exploded view illustrating the relative parts;

Fig. 4 is a modification of the holder shown by illustration in Fig. 1; and

Fig. 5 is a view illustrating the relationship of the glasses to a gas mask.

The present invention is directed to corrective glasses which may be used with a gas mask. The lenses are secured in a frame similar to those of regular glasses and then the frames are connected to an adjustable holder which is connected with a two point suspension to the face blank of the mask. The holder is also provided with a pad which rests on the forehead to provide a supporting means for better positioning of the lenses. The glasses also have a spring on the front thereof which fits against the lens of the mask face to force the lenses in their proper position with respect to the eyes.

Now referring to the drawings, where like reference characters represent like parts throughout, there is shown by illustration an improved holder 10 for mounting corrective glasses in a gas mask. The lenses 11 are mounted in a lens frame 12 made of plastic or any other suitable material which is provided with the usual conventional lens frames separated by a bar and nose pads 13 secured thereto by any suitable means. The upper surface of the lens frame has secured thereto S-shaped ends 14 of a spring steel wire 15 by any suitable means such as screws 16, the points of connection being equidistant from a center line through the lens frame across the bar separating the lens frame. The wire 15 is somewhat U-shaped with the ends thereof curved into a S-shape for the purpose of adjusting the lens frame vertically. The central portion of the wire 15 extends parallel to a line drawn through the points where the S-shaped ends connect with the lens frame and has a forehead pad 19 of rubber or any other suitable material secured about the wire along the central portion. Two L-shaped support rods 17 are pivotally connected at one end to the central portion of wire 15 in spaced relationship with respect to the center line to form supports by which the holder is secured to the face blank 21 of the mask. The face blank 21 is provided with two small elongated metal cylinders 22 located directly above the normal lens window 20 within which the free ends 23 of the L-shaped support rods enter to secure the holder 10 to the mask. The lens frame also has a V-shaped leaf spring 24 secured at the cross bar 25 between the lenses. The leaf spring is adapted to press against the normal mask lens window to force the lens frame gently and firmly against the face in order to position the glasses in their proper position.

The desired corrective lenses are secured in the frames in the conventional manner. The lens frame, the U-shaped wire 15, the forehead pad and the L-shaped support rods 17 are assembled to form the holder 10. The holder is then attached to the face blank of the gas mask at the central portion along the forehead. The holder can be attached to any gas mask that has been modified to include the metal cylinders or similar means; therefore, any one having a pair of said corrective glasses can use them for different gas masks.

The modification of the face blank to include the metal cylinders does not destroy the gas tight seal at that or any other position; therefore, the gas mask can be used by other personnel not needing the corrective glasses as well as those who need the glasses.

In use of the corrective glasses with a gas mask, the free ends 23 of the support rods are inserted into the cylinders within the modified portion of the face blank. The mask is ready for use and when the mask has been put over the face, the glasses are properly positioned relative to the eyes. The glasses are properly positioned vertically by adjusting the spring steel S-shaped ends connected to the lens frame and on putting the mask over the face, the forehead pad rests on the forehead to properly hold the glasses the correct distance from the eyes. At the same time the forehead pad rests on the forehead, the V-shaped leaf spring contacts the face lens window of the mask and forces the glasses back against the face. The combination of the forehead pad, the nose pads and the V-shaped leaf spring properly positions the glasses with respect to the eyes.

The modification shown by illustration in Fig. 4 shows a metal spectacle frame 31 within which corrective lenses 32 are secured. A spring wire holder 33 is secured to the metal frame by any suitable means such as solder. The spring wire holder is made from two pieces of wire 34 and 35 soldered together above the bridge 36 of the spectacle frame along the center line of the frame. The piece 34 is formed with S-shaped ends 37 and 38, with the center portion 39 between the ends parallel with a line tangent to the upper edge of each of the lens holders. The ends 37 and 38 of the wire 34 are shaped to conform with the upper edges of the frame and soldered thereto as shown. The piece of wire 35 is formed with a center section 41 which is adapted to parallel the center portion 39 of wire 34 and to be connected thereto. The wire 34 has two S-shaped sections 42 and 43 which extends from the parallel center portion 41 and the ends 44 and 45 of the S-shaped portions are turned inwardly toward each other to provide means by which the holder can be connected to the face blank of the gas mask. The two wire sections are bound together with seizing wire 46 for added strength and then soldered to form a rigid joint. The bound portion is then covered by some means such as a plastic covering 47 to protect the forehead from the bound section of the wires. The frames are provided with a V-shaped leaf spring 24 which is adapted to press against the normal mask lens window, as shown in Fig. 5, to force the lens frame gently and firmly against the nose in order to position the glasses in their proper position.

It is to be understood that the lens frame of the above modification could be made of plastic and the ends of the wires 37 and 38 connected thereto by any suitable means, also, the holder may be connected to the face blank by any suitable method. A preferred manner is to vulcanize a rubber strip to the face blank with grooves on its adhering surface forming holes which receive the ends 44 and 45 of the wire 35. The wires are spread apart and inserted into the holes of the strip to secure the corrective lens holder to the mask.

Corrective glasses secured within a gas mask according to the present invention provides properly fitted glasses and prevents movement of the glasses with respect to the eyes even if the face of the mask is hit, pushed, or jarred to cause vibrations or movement of the mask. The end of the V-shaped leaf spring contacting the lens on the face of the mask acts as a pivot point to allow movement of the mask without moving the glasses.

The elliptical shape of the frame and the lenses shown by the drawing is to prevent the lens frame from hitting the sides of the mask. This prevents the glasses from being forced against the face and also prevents movements thereof through movement of the mask face.

Obviously many modifications and variations of the present invention are possible in the light of the above teachings. It is therefore to be understood that within the scope of the appended claims the invention may be practiced otherwise than as specifically described.

What is claimed is:

1. A holder for mounting corrective glasses in a gas mask having a face blank and a normal lens window in the mask, said holder comprising a lens frame for receiving corrective lenses within each lens holder of said frame, a spring wire means connected at the ends thereof to said lens frame above said lens holder and adjustable relative to the lens window of said mask, support means connected to said spring wire means, said support means pivotably secured to said face blank directly above said normal lens window and spring means secured to said lens frame to contact said lens window and thereby urge said lens frame against the face and in proper alignment with the eyes of a user of said gas mask.

2. A holder for mounting corrective glasses in a gas mask having a face blank and a normal lens window in the mask, said holder comprising a lens frame for receiving corrective lenses within each lens holder of said frame, a generally U-shaped spring wire means connected at the ends thereof to said lens frame above said lens holder, L-shaped support means pivotably connected to said spring wire means and pivotably secured to said face blank directly above said normal lens window and spring means secured to said lens frame to contact said lens window and thereby urge said lens frame against the face and in proper alignment with the eyes of a user of said gas mask.

3. A holder as claimed in claim 2 wherein the ends of said U-shaped wire are of S-shape to vertically adjust said lens frame.

4. A holder as claimed in claim 3 wherein the portion of said U-shaped wire to which said L-shaped support rods are pivotably connected forms a central portion parallel to a line drawn through the points at which said S-shaped ends are connected to said lens frames, said central portion of said U-shaped wire has a pad secured thereto which contacts the forehead of a user of said mask.

5. A holder for mounting corrective glasses in a gas mask having a face blank and a normal lens window in the mask, said holder comprising a lens frame having two lens holders for receiving corrective lenses therein and separated by a bar, a spring wire having a central portion and S-shaped end sections rigidly connected at the ends thereof to said lens frame above said lens holders at points equally spaced from a center line through the bar separating said lens holders, said spring wire secured for vertical adjustment of said lens frame, L-shaped support rods connected to said spring wire means at points equidistant from said center line, said L-shaped support rods pivotably secured to said face blank directly above said normal lens window on opposite sides of a center line through the mask, said face blank having supports therein to receive ends of said L-shaped support rods, spring means secured to said bar separating said lens holders to contact said lens window and thereby urge said lens frame against the face and in proper alignment with the eyes of a user of said gas mask and a forehead pad secured to said central portion of said spring wire contacts the forehead of a person wearing the mask to position the lens frame relative to the eyes of the person wearing said mask.

References Cited in the file of this patent

UNITED STATES PATENTS

| | | |
|---|---|---|
| 2,396,207 | Schutz et al. | Mar. 5, 1946 |
| 2,496,969 | Wentworth | Feb. 7, 1950 |

FOREIGN PATENTS

| | | |
|---|---|---|
| 534,974 | Great Britain | Mar. 25, 1941 |